United States Patent [19]

Ito et al.

[11] 4,260,492
[45] Apr. 7, 1981

[54] ROTARY DIAPHRAGM PRESS

[75] Inventors: Masaharu Ito, Kobe; Shiro Kondo, Miki; Kazuo Honjo, Himeji, all of Japan

[73] Assignee: Shinko-Pfaudler Company Ltd., Hyogo, Japan

[21] Appl. No.: 52,351

[22] Filed: Jun. 27, 1979

[30] Foreign Application Priority Data

Jul. 1, 1978 [JP] Japan .................................. 53/80314
May 23, 1979 [JP] Japan .................................. 54/63649

[51] Int. Cl.³ .............................................. B01D 33/14
[52] U.S. Cl. ..................................... 210/386; 100/211; 162/317; 210/401
[58] Field of Search ...................... 210/386, 390, 391; 100/211; 162/317

[56] References Cited

U.S. PATENT DOCUMENTS

| | | | |
|---|---|---|---|
| 3,375,932 | 4/1968 | Ishigaki | 210/390 |
| 3,383,884 | 5/1968 | Meyer | 100/211 |
| 3,603,122 | 9/1971 | Sulzmann | 100/211 |
| 3,804,707 | 4/1974 | Mohr | 100/211 |
| 3,897,341 | 7/1975 | Ozawa | 210/386 |
| 4,000,242 | 12/1976 | Hartbayer | 100/211 |
| 4,024,810 | 5/1977 | Braun | 100/211 |
| 4,030,960 | 6/1977 | Batt | 100/211 |
| 4,088,581 | 5/1978 | Carle | 210/391 |
| 4,106,404 | 8/1978 | Schmid | 100/211 |

FOREIGN PATENT DOCUMENTS

| | | | |
|---|---|---|---|
| 1149612 | 5/1963 | Fed. Rep. of Germany | 100/211 |
| 47-25717 | 2/1972 | Japan | 100/386 |
| 801634 | 3/1958 | United Kingdom | 100/211 |

*Primary Examiner*—Theodore A. Granger
*Attorney, Agent, or Firm*—Pearne, Gordon, Sessions, McCoy & Granger

[57] ABSTRACT

A rotary diaphragm press comprises a revolving drum on the periphery of which a tubular diaphragm is mounted, an endless belt assembly which consists of a cover cloth, a filter cloth, and a back-up belt separately extended and arranged one above the other over said revolving drum, and a series of receiving rollers disposed in parallel with a spindle for said revolving drum so as to press the endless belt assembly against the drum in a contact zone of the assembly. The rotary diaphragm press is further designed so that sludge successively fed to the filter cloth is held between the filter cloth and the cover cloth and is passed through the contact zone.

9 Claims, 9 Drawing Figures

ROTARY DIAPHRAGM PRESS

BACKGROUND OF THE INVENTION

1. Field of the Invention

The present invention primarily relates to a rotary diaphragm press of a rotary drum type, which aims at continuous dehydration of sludge discharged from an industrial waste water treatment plant, a sewage treatment plant and the like.

2. Description of the Prior Art

Frequently, such sludge contains aluminium hydroxide as the main component or is excess activated sludge produced in the process of biological treatment. Generally, a dewatered cake obtained from such sludge is still, for the most part, water and thus involves difficulties in conveying it to a remote place for discharge or in drying, burning it up thereby incurring much expense for handling, transportation thereof or requiring much fuel consumption. For this reason, it is desirable to reduce the percentage of water contained in the dewatered cake as much as possible in the process of dehydration.

Various techniques have been employed in the dehydrating of sludge. Among them, a pressure squeeze technique which is typified by a filter press is far superior in reduction of the percentage of water contained in the dewatered cake. Disadvantages derived from this technique are that due to its batch operation much squeezing time is required to make the cake in large thickness for the purpose of securing a treated amount and for proving exfoliation of the cake, and also many accessory installations are required for the batch operation and it is difficult to render the dehydration process continuous.

On the other hand, a continuous dehydrator which relies on vacuum or centrifugal technique has been widely used but its use is limited to an attainable percentage of water content when the above-mentioned sludge is treated.

There has been proposed a belt pressure dehydrator as described in Japanese Utility Model Publication No. 25717/72.

In view of the fact that a reduction in the percentage of water contained in the cake depends upon the squeeze pressure and the time for squeeze, a belt pressure dehydrator of this class is designed so as not to apply the squeeze pressure to the entire area to be squeezed but to limit such pressure to an area against which rollers abut so that the squeeze time is shortened to render reduction in the percentage of water contained in the cake insufficient. Specifically, a problem has arisen in that there is insufficient pre-condensation of sludge since sludge is subjected to a heavy squeeze pressure at the first roller station and is thinly spread and this interferes with the effective dehydration.

SUMMARY OF THE INVENTION

It is an object of the present invention to provide a rotary diaphragm press which is designed so that with aid of fluid pressure a local squeeze zone is provided in a roller station and that uniform squeeze pressure is maintained in the whole area of the squeeze zone to increase the effective time for squeeze thereby eliminating the aforementioned defects inherent in the belt pressure dehydrator.

Another object of the present invention is to provide a rotary diaphragm press which comprises an endless belt assembly consisting of a hold-down woven belt or cover cloth, a filter woven belt or filter cloth, a non-extensible, permeable back-up belt made of wire netting, caterpillar or the like separately extended and arranged one above the other over a revolving drum on the periphery of which a tubular hollow member of flexible, pressure resistive material such as rubber and the like are arranged, and a plurality of receiving rollers disposed in parallel with a spindle for the revolving drum to form a squeeze zone to allow a substantially uniform squeeze pressure to act between the tubular hollow member inflated by introduction of fluid pressure and the back-up belt in a contact zone whereby sludge held between the filter woven belt and the hold-down woven belt is passed between the contact and squeeze zone to allow fluid pressure to act over a wide range in the squeeze zone thus providing a highly efficient dehydration effect.

For a fuller understanding of the nature and objects of the invention, reference should be had to the following detailed description taken in connection with the accompanying drawings.

DETAILED DESCRIPTION OF THE PREFERRED EMBODIMENTS

Figure 1:
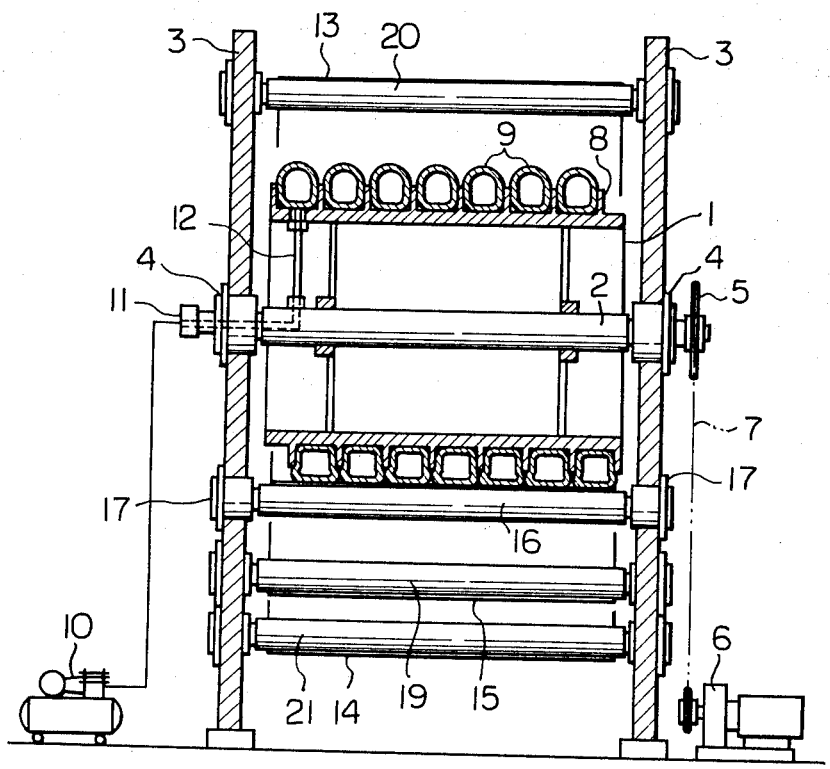
FIG. 1 is a longitudinal section of a continuous compressive dehydrating apparatus forming the exemplary embodiment of the invention.

As a preferred example of the present invention, a rotary cylindrical drum 1 includes a spindle 2 disposed centrally thereof, with the spindle being horizontally supported by bearings 4, 4 mounted on a pair of frames 3, 3. The rotary drum is rotatably driven by movement of a chain 7 trained around a sprocket 5 arranged on the spindle and a prime mover 6.

Figure 3:
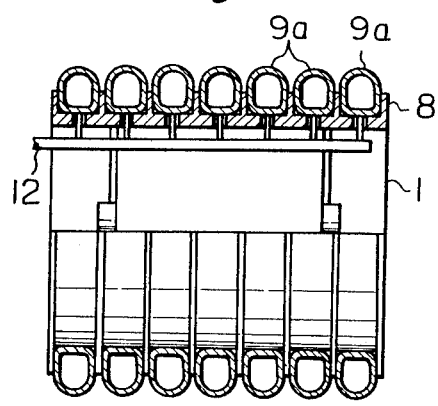
FIGS. 3, 4 and 5 are partial views in transverse section of the manner in which modified forms of a flexible, pressure resistive hollow tube are mounted on the periphery of the respective rotary drums.

Referring to FIG. 1, grooves are shown as helically defined by ribs 8 and the like formed on the periphery of the rotary drum 1 to receive therein a flexible, pressure resistive hollow tube 9 the opposite ends of which are fixed to the rotary drum 1. As is apparent from the foregoing description, in lieu of the hollow tube, any circular tube, such as a tire tube may be employed. As shown in FIG. 3, a plurality of hollow tubes 9a, 9a may be arranged on the rotary drum. Also a single hollow tube 9b of flat cross-section may be mounted on the rotary drum when the latter is short in its axial length.

Fluid pressure, as for example, compressed air is introduced from a supply source 10 via a rotary joint 11, a pressure conduit 12 to the hollow tube 9. This fluid pressure is maintained at a constant pressure during operation of the apparatus.

Figure 2:
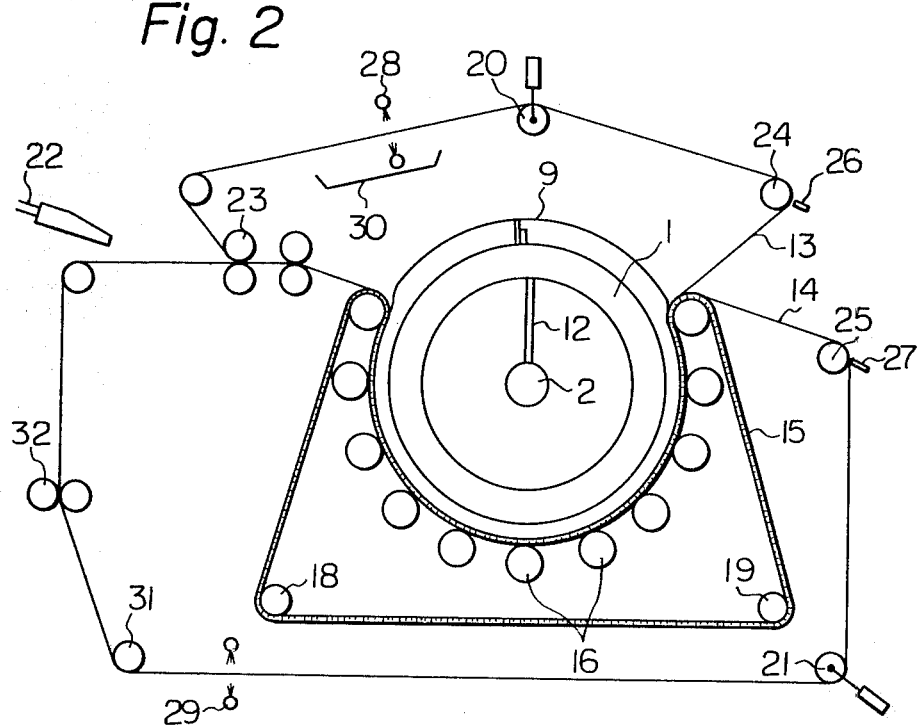
FIG. 2 is a cross-sectional view of the apparatus.
Figure 4:
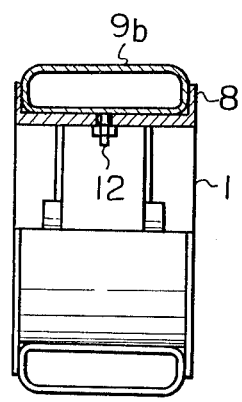
Figure 5:
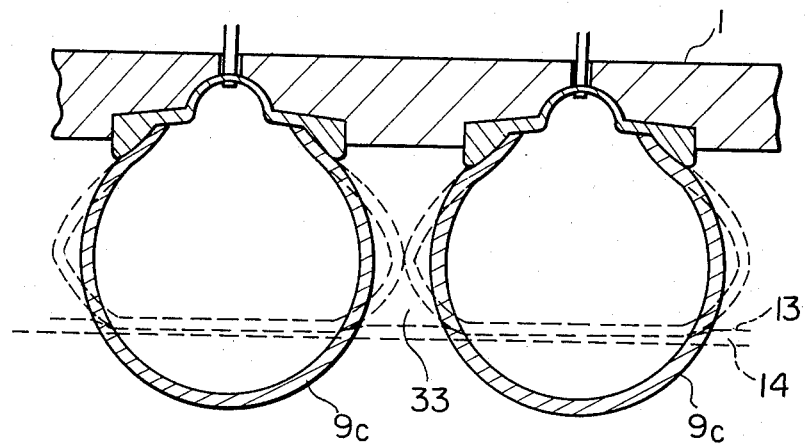

An endless belt assembly which comprises a hold-down woven belt or cover cloth 13, a filter woven belt or filter cloth 14, and a non-extensible permeable back-up belt 15 arranged one above the other from the rotary drum with the hollow tube 9 carried thereon, is trained about the drum on the periphery thereof, as shown in FIG. 2. A plurality of receiving or bearing rollers 16, 16 ... are arranged peripherally of the area of belt contact with the drum at a small distance in parallel with the spindle 2 for the rotary drum so as to be subjected to a compressive force derived from the hollow tube. The distance between the rotary drum 1 and the respective receiving rollers 16, 16 is such that the periphery of the hollow tube 9 inflated by introduction of pressure fluid thereto may afford a wider contact surface as a result of being urged against the hold-down woven belt thereby forming a depression over the entire contact surface. When it is required to mount a single hollow tube 9b on the drum as shown in FIG. 4, it is allowed to be in a whole contact with the hold-down woven belt 13 over such a depression. The problem associated with the rotary drum when it is fabricated longer in its axial length is the difficulty in pressure resistive strength and in structure in which a magnified force is acted on the opposite mounted sides of the hollow tube when power is transmitted. This arrangement will provide a clearance between the adjacent hollow tubes 9, 9 and the hold-down woven belt 13 over the depression when a plurality of the hollow tubes 9, 9 are juxtaposed on the periphery of the rotary drum 1. Due to the presence of such clearance, fluid pressure in the hollow tubes 9, 9 is not uniformly transmitted to sludge. This condition is best shown in FIG. 5 which is a fragmentary enlarged section of the manner in which tire tube like hollow tubes 9c, 9c are mounted. Each of the hollow tubes 9c, 9c is pressed against the hold-down woven belt 13 and deformed in the depressed zone as indicated by the dotted line to obtain a wider contact surface. However, a clearance 33 is still left between the adjacent hollow tubes 9c, 9c and a dehydration effect is not fully produced at the places where the hollow tubes 9c, 9c are not in contact with the keep woven belt 13.

FIGS. 6 to 9 are fragmentary enlarged sections of various forms of the hollow tube which is adapted to substantially eliminate the clearance 33 to allow a compressed force to act on a wider range.

Figure 6:
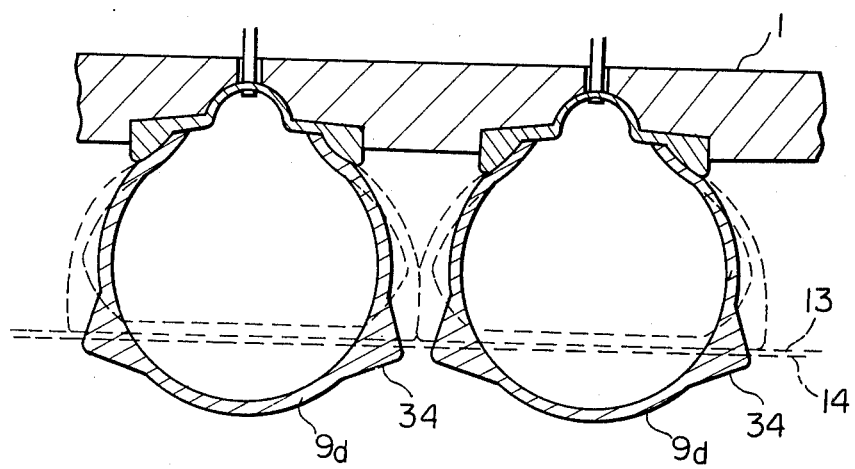
FIG. 6 is a partial view in section of hollow tubes each having a thickness of convex cross section.

FIG. 6 shows the tire tube like hollow tubes 9d, 9d each having a thicker portion of convex cross-section partially formed thereof.

As shown, each of the hollow tubes 9d, 9d is adapted, when deformed in the depressed zone as indicated by the dotted line, to cause the thick portion 34 to extend into the clearance 33 to thus increased the contact area between the adjacent hollow tubes and the hold-down woven belt 13.

Figure 7:
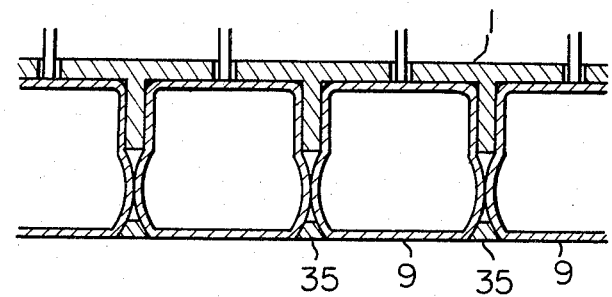
FIGS. 7, 8 and 9 are partial views in section of the manner in which various band fillers are mounted.

FIG. 7 is a representation showing the hollow tubes between which a band filler 35 of trapezoid cross-section is fitted with which the clearance 33 is filled. The band filler may take any cross-sectional form other than trapezoidal, as for example, triangular, square, or circular so long as it will serve to substantially fill the clearance 33.

Figure 8:
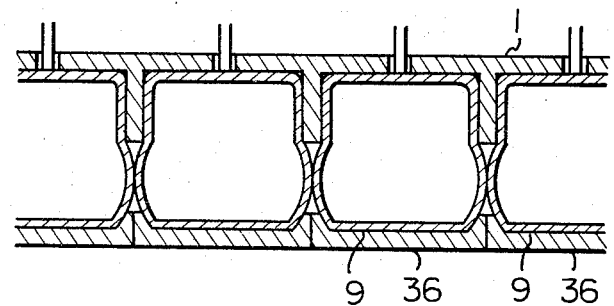

FIG. 8 is a view of a plurality of band fillers 36 of concave cross-section, each having complementary lugs at opposite ends thereof but showing the manner in which the clearance 33 between the adjacent hollow tubes is filled with the respective complementary lugs when the respective band fillers are arranged side by side on the periphery of the hollow tubes.

Figure 9:
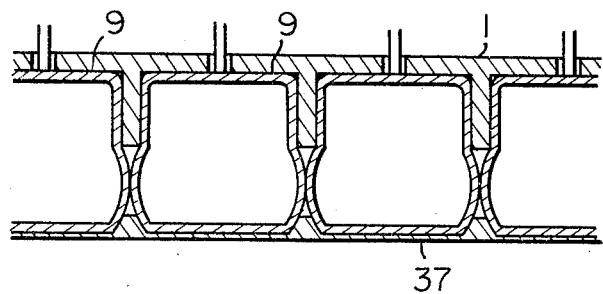

FIG. 9 shows a sheet of the wider band filler 37 which is provided with a series of ridges fitted into the corresponding clearances 33, with the band filler being interposed between a series of the hollow tubes 9, 9 and the hold-down woven belt 13.

The back-up belt 15 is stretched on feed rollers 18, 19 and the hold-down woven belt 13 and the filter woven belt 14 are stretched on tension adjusting rollers 20, 21, respectively. The endless belt assembly is driven by the drive of the rotary drum 1 while subjected to a compressive force from the hollow tubes to pass through the contact zone at a speed substantially the same as the peripheral speed of the hollow tubes.

A sludge supply station 22 is disposed over the filter woven belt 14 running forwardly of the contact zone. Sludge which is successively fed from the sludge supply station 22 to the filter woven belt 14, is held between the filter woven belt 14 and the hold-down woven belt 13 and then introduced by rollers 23 into the depressed zone or squeeze zone. Sludge in the depressed zone is subjected to fluid pressure which acts between the hollow tubes 9, 9 and the back-up belt 15 supported on a series of the bearing rollers 16, 16, and is then depressed and dewatered to form it into a sheet cake to be discharged from the apparatus.

Slough rollers 24, 25 are positioned on the hold-down woven belt 13 and the filter woven belt 14 running rearwardly of the contact zone and include scrapers 26, 27, respectively, mounted thereon. Washers 28, 29 are arranged on the hold-down woven belt 13 and the filter woven belt 14 to wash the latter with a spray of water. A washing water tray 30 is mounted downwardly of the washer 28. Further, a meander prevention roller 31 and a filter woven squeeze roller 32 are provided on the part of the filter woven belt 14.

According to the arrangement as above described, sludge is successively fed from the supply station 22 to the filter woven belt 14 and held between the filter woven belt 14 and the hold-down woven belt 13. On the other hand, fluid pressure in the hollow tubes 9, 9 is transmitted over a wide range of sludge thus passed through the depressed zone to thereby produce a highly efficient dehydration effect.

EXAMPLE 1

Result of dehydration treatment of excess activated sludge with solid matter concentration of 1.5%.

1. A dewatered cake was prepared with the use of the hollow tubes 9c,9c of FIG. 5 and with about a 65% contact area between the hollow tubes and the hold-down woven belt in the depressed zone. The dewatered cake had a thickness of about 1 mm and about a 70% water content in the area of contact with the hollow tubes, and a thickness of about 2.5 mm and about a 78% water content in the area of non-contact with the hollow tubes.

2. A dewatered cake having a 71% average water content and a uniform thickness was obtained with the use of a rubber band filler of trapezoid cross-section as shown in FIG. 7 pressed into the clearance between the adjacent hollow tubes 9c,9c and the hold-down woven belt.

EXAMPLE 2

For comparison, a dehydration treatment of various sludges with a dehydrator A of another type and with the continuous squeeze dehydrator B for use with the hollow tube 9d shown in FIG. 6 gave the results indicated below. Dosage applied in each of examples is shown in % to a solid matter.

1. The following Table shows data obtained by comparison with two dehydration treatments with a vacuum dehydrator A and the instant dehydrator B for a mixed sludge (solid matter concentration 2.5%) of excess activated sludge in a final settling basin and sludge in an initial settling basin in a sewage treatment plant.

| Dosage | | Percentage of water contained in dewatered cake |
|---|---|---|
| (A) | FeCl₃ 30%, Ca(OH)₂ 100% | 79.8% |
| (B) | FeCl₃ 8.8%, coagulant aid 0.2% | 63.9% |

As compared with the dewatered cake obtained by the dehydrator A, the other dewatered cake obtained by the instant dehydrator B has about ¼ less volume so that the instant cake is easier to handle and to transport and is of advantage to fuel consumption and incinerated residuum when dried and burnt up. Further, when the dewatered cake obtained by the dehydrator A is again dewatered by the instant dehydrator B, the resulting dewatered cake has a 60.1% water content and a volume ratio of about ⅓.

2. The following Table illustrates data obtained by comparison with two dehydration treatments with a filter press A and the instant dehydrator B for excess activated sludge (solid matter concentration 1.28%) in an activated sludge treatment plant of a food mill.

| Dosage | | Percentage of water contained in dewatered cake |
|---|---|---|
| (A) | FeCl₃ 10%, Ca(OH)₂ 25% | 78% |
| (B) | FeCl₃ 4.3%, coagulant aid 0.6% | 76% |

Treatment with the instant dehydrator B provides a better dehydration effect with lesser dosage than that attained with the filter press A.

3. The following Table shows data obtained by comparison with two dehydration treatments with a belt pressure dehydrator A and the instant dehydrator B for excess activated sludge (solid matter concentration 1.5%) in an activated sludge treatment plant of a food mill.

| Dosage | | Percentage of water contained in dewatered cake |
|---|---|---|
| (A) | coagulant aid 0.5% | 85% |
| (B) | FeCl₃ 6.4%, coagulant aid 0.4% | 73.5% |

4. The following Table represents data obtained by comparison with two dehydration treatments with a belt pressure dehydrator A and the instant dehydrator B for a skimmed sludge (solid matter concentration 1.7%) whose main component is aluminium hydroxide in a pressurized air floatation treatment plant.

| Dosage | | Percentage of water contained in dewatered cake |
|---|---|---|
| (A) | coagulant aid 0.5% | 89.6% |
| (B) | coagulant aid 0.5% | 67% |

5. The following Table shows data obtained by comparison with two dehydration treatments with a centrifugal dehydrator A and the instant dehydrator B for a skimmed sludge (solid matter concentration 2.5%) in a pressurized air floatation treatment plant of a paper mill.

| Dosage | | Percentage of water contained in dewatered cake |
|---|---|---|
| (A) | coagulant aid 0.2% | 73% |
| (B) | coagulant aid 0.2% | 62% |

As is obvious from the foregoing description and embodiments, the continuous squeeze dehydrator according to the present invention is adapted to allow the rollers to apply a local squeeze force in the squeeze zone which manifests a squeeze effect over a wider range thereby increasing effective squeeze time and decreasing the percentage of water contained in the dewatered cake as compared with the conventional belt pressure dehydrator. This reduces handling and transportation charges or the like of the cake and reduces fuel consumption when the cake is dried and burnt up.

As compared with a pressure squeeze system employed by the filter press and the like, the instant hydrator is designed to rely on a continuous treatment and so that the hold-down and filter woven belts are reoriented at positions where the slough rollers are disposed. This will provide a good exfoliation for the dewatered cake and render the cake thick enough. As a result, a dehydration effect equal to or more than the filter press, is attained for a comparatively short time and at a low pressure squeeze. Further, the instant hydrator is simple in construction and requires less power and less accessory installation so that it is readily and inexpensively manufactured and maintained.

It is to be understood that changes and variations may be made without departing from the spirit and scope of the invention as defined in the appended claims.

What is claimed is:

1. A rotary diaphragm press for continuous squeeze filtering for sludge dehydration comprising a drum having a longitudinal axis about which it is adapted to revolve and having a tubular diaphragm mounted on its periphery, said tubular diaphragm including abutting, fluid pressure inflatable tubular hollow portions arranged side by side with a clearance between adjacent portions to provide an outer peripheral surface, an endless belt assembly comprising a cover cloth, a filter cloth, and a non-extensible, permeable back-up belt separately extended and arranged one above the other over said outer peripheral surface, and a series of receiving rollers disposed in parallel with a spindle for said drum so as to press said endless belt assembly against said outer peripheral surface in a contact zone of said endless belt assembly, a squeeze zone formed in said contact zone to allow fluid pressure to act between said back-up belt and said tubular diaphragm, and filler means arranged to be disposed in said clearance between said adjacent tubular hollow portions and said cover cloth within said squeeze zone to allow fluid pressure to act substantially uniformly in an axial direction of said drum within said squeeze zone.

2. A rotary diaphragm press as set forth in claim 1 wherein said tubular diaphragm is formed of flexible, pressure resistant hollow tubes.

3. A rotary diaphragm press as set forth in claim 1 wherein said tubular diaphragm is in the form of a tire tube.

4. A rotary diaphragm press as set forth in claim 1 wherein said tubular diaphragm is a tubular member helically wound around the periphery of said drum.

5. A rotary diaphragm press as set forth in claim 1 wherein said tubular diaphragm comprises a plurality of tubular members mounted side by side on the periphery of said drum.

6. A rotary diaphragm press as set forth in claim 1 wherein said tubular hollow portions include a thickness of convex cross-section extending into said clearance formed between adjacent tubular hollow portions.

7. A rotary diaphragm press as set forth in claim 1 wherein said filler means comprises a band filler mounted in said clearance between the adjacent tubular hollow portions and the cover cloth.

8. A rotary diaphragm press as set forth in claim 1 wherein said filler means is a belt having a concave cross-section and is mounted in said clearance between the adjacent tubular hollow portions.

9. A rotary diaphragm press as set forth in claim 1 wherein said tubular diaphragm includes a plurality of said clearances, each of said clearances being between adjacent tubular hollow portions, and said filler means is a sheet having ridges which fit into said clearances between the adjacent tubular hollow portions.

* * * * *